United States Patent
Kothari et al.

(10) Patent No.: US 7,903,316 B2
(45) Date of Patent: Mar. 8, 2011

(54) MEMS DISPLAY DEVICES AND METHODS OF FABRICATING THE SAME

(75) Inventors: Manish Kothari, Cupertino, CA (US); Hung-Ta Chang, Taipei (TW); Jan Bos, Hsinchu (TW); Surya Prakash Ganti, Los Altos, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 212 days.

(21) Appl. No.: 12/179,337

(22) Filed: Jul. 24, 2008

(65) Prior Publication Data
US 2009/0086306 A1     Apr. 2, 2009

Related U.S. Application Data

(60) Provisional application No. 60/951,930, filed on Jul. 25, 2007.

(51) Int. Cl.
*G02B 26/00* (2006.01)
(52) U.S. Cl. ......................... 359/291; 359/290
(58) Field of Classification Search .................. 359/223, 359/224, 290, 291, 292, 238
See application file for complete search history.

(56) References Cited

U.S. PATENT DOCUMENTS

| | | |
|---|---|---|
| 4,551,197 A | 11/1985 | Guilmette et al. |
| 4,852,516 A | 8/1989 | Rubin et al. |
| 5,002,631 A | 3/1991 | Giapis et al. |
| 5,083,364 A | 1/1992 | Olbrich et al. |
| 5,334,250 A | 8/1994 | Mikami et al. |
| 5,374,346 A | 12/1994 | Bladon et al. |
| 5,536,359 A | 7/1996 | Kawada et al. |
| 5,771,321 A * | 6/1998 | Stern ............................. 385/31 |
| 5,773,088 A | 6/1998 | Bhat |
| 5,785,877 A | 7/1998 | Sato et al. |
| 5,808,780 A | 9/1998 | McDonald |
| 5,906,536 A | 5/1999 | Imazato et al. |
| 5,919,548 A | 7/1999 | Barron et al. |
| 5,940,684 A | 8/1999 | Shakuda et al. |

(Continued)

FOREIGN PATENT DOCUMENTS

EP           0 578 228           1/1994

(Continued)

OTHER PUBLICATIONS

Brosnihan et al., "Optical IMEMS—A fabrication process for MEMS optical switches with integrated on-chip electronic," Transducers, Solid-State Sensors, Actuators and Microsystems, 12th International Conference 2003, vol. 2, issue, 8-12 pp. 1638-1642, Jun. 2003.

(Continued)

*Primary Examiner* — Timothy J Thompson
(74) *Attorney, Agent, or Firm* — Knobbe Martens Olson & Bear LLP

(57) ABSTRACT

MEMS devices include materials which are used in LCD or OLED fabrication to facilitate fabrication on the same manufacturing systems. Where possible, the same or similar materials are used for multiple layers in the MEMS device, and use of transparent conductors for partially transparent electrodes can be avoided to minimize the number of materials needed and minimize fabrication costs. Certain layers comprise alloys selected to achieve desired properties. Intermediate treatment of deposited layers during the manufacturing process can be used to provide layers having desired properties.

38 Claims, 10 Drawing Sheets

U.S. PATENT DOCUMENTS

| | | | |
|---|---|---|---|
| 6,033,919 A | 3/2000 | Gnade et al. | |
| 6,040,937 A | 3/2000 | Miles | |
| 6,170,332 B1 | 1/2001 | MacDonald et al. | |
| 6,218,056 B1 | 4/2001 | Pinarbasi et al. | |
| 6,335,224 B1 | 1/2002 | Peterson | |
| 6,409,876 B1 | 6/2002 | McQuarrie et al. | |
| 6,511,917 B2 | 1/2003 | Haji et al. | |
| 6,558,506 B1 | 5/2003 | Freeman et al. | |
| 6,674,562 B1 | 1/2004 | Miles | |
| 6,696,096 B2 | 2/2004 | Tsubaki et al. | |
| 6,713,235 B1 | 3/2004 | Ide et al. | |
| 6,736,987 B1 | 5/2004 | Cho | |
| 6,822,304 B1 | 11/2004 | Honer | |
| 6,919,274 B2 | 7/2005 | Kazumi et al. | |
| 6,949,202 B1 | 9/2005 | Patel et al. | |
| 7,050,219 B2 | 5/2006 | Kimura | |
| 7,064,089 B2 | 6/2006 | Yamazaki et al. | |
| 7,123,216 B1 | 10/2006 | Miles | |
| 7,195,343 B2 | 3/2007 | Anderson et al. | |
| 7,221,495 B2 | 5/2007 | Miles et al. | |
| 7,297,471 B1 | 11/2007 | Miles | |
| 7,327,510 B2 | 2/2008 | Cummings et al. | |
| 2002/0033229 A1 | 3/2002 | Lebouitz et al. | |
| 2002/0045362 A1 | 4/2002 | Yang | |
| 2002/0162569 A1 | 11/2002 | Kuo et al. | |
| 2003/0104752 A1 | 6/2003 | Lee et al. | |
| 2003/0121609 A1 | 7/2003 | Ohmi et al. | |
| 2004/0000489 A1 | 1/2004 | Zhang et al. | |
| 2004/0028849 A1 | 2/2004 | Stark et al. | |
| 2004/0188785 A1 | 9/2004 | Cunningham et al. | |
| 2005/0001274 A1 | 1/2005 | Kim et al. | |
| 2005/0231787 A1 | 10/2005 | Tsuboi et al. | |
| 2006/0067648 A1 | 3/2006 | Chui et al. | |
| 2006/0067650 A1 | 3/2006 | Chui | |
| 2006/0096705 A1 | 5/2006 | Shi et al. | |
| 2006/0186759 A1 | 8/2006 | Kim et al. | |
| 2006/0266730 A1 | 11/2006 | Doan et al. | |
| 2007/0020794 A1 | 1/2007 | DeBar | |
| 2007/0026636 A1 | 2/2007 | Gogoi | |
| 2007/0041076 A1 | 2/2007 | Zhong et al. | |
| 2007/0042521 A1 | 2/2007 | Yama | |
| 2007/0209437 A1* | 9/2007 | Xue et al. | 73/514.31 |
| 2008/0017830 A1* | 1/2008 | Takeda | 252/299.1 |
| 2008/0283180 A1 | 11/2008 | Bachman et al. | |
| 2008/0318344 A1 | 12/2008 | Rafanan | |
| 2009/0218312 A1 | 9/2009 | Floyd et al. | |
| 2009/0315567 A1* | 12/2009 | Chou et al. | 324/551 |

FOREIGN PATENT DOCUMENTS

| | | |
|---|---|---|
| EP | 0 747 684 | 12/1996 |
| EP | 0 878 824 | 11/1998 |
| JP | 07-161688 | 6/1995 |
| WO | WO 02/19391 | 3/2002 |
| WO | WO 2004/075231 | 9/2004 |

OTHER PUBLICATIONS

O'Mara, "Chapter Two: Display Manufacturing Process," Liquid Crystal Flat Panel Displays, 1993, pp. 57-111, Chapman & Hall, NY.

Penta Vacuum MEMS Etcher Specifications, HTTP—WWW. PENTAVACUUM.COM-MEMES.HTM, 2002.

Rao et al., Single-mask, three-dimensional microfabrication of high-aspect-ratio structures in bulk silicon using reactive ion etching lag and sacrificial oxidation, Applied Physics Letters 85(25):6281-6283 Dec. 20, 2004.

International Search Report and Written Opinion issued in PCT/US2008/070928, dated Oct. 24, 2008 (11 pages).

Chung et al., 2005, Fabrication and characterization of amorphous Si films by PECVD for MEMS, J. Micromech. Microeng. 15:136-142.

Hacker et al., 1997, Properties of new low dielectric constant spin-on silicon oxide based polymers, Mat. Res. Soc. Symp. Proc. 476:25-30.

Kucherenko, 2000, Modelling effects of surface tension on surface topology in spin coatings for integrated optics and micromechanics, J. Micromech Microeng., 10:299-308.

Rusu et al., 2001, Planarization of deep trenches, Proc. SPIE, 4557:49-57.

IPRP for PCT/US08/070928 filed Jul. 23, 2008.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

MEMS DISPLAY DEVICES AND METHODS OF FABRICATING THE SAME

CROSS-REFERENCE TO RELATED APPLICATIONS

This application claims priority to U.S. Provisional Patent Application No. 60/951,930, filed Jul. 25, 2007, which is hereby incorporated by reference in its entirety.

BACKGROUND OF THE INVENTION

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

In one embodiment, an optical MEMS device is provided, including a conductive optical absorber formed over a substrate and patterned to form strip electrodes, where the optical absorber serves as the primary conductor in the strip electrodes within optically active areas of the MEMS device, at least one support structure formed over the optical absorber, and a conductive deformable layer formed over the at least one support structure and spaced apart from the conductive optical absorber, where the deformable layer is electrostatically deflectable towards the optical absorber.

In another embodiment, method of fabricating an optical MEMS device is provided, the method including forming a conductive optical absorber over a substrate, patterning the conductive optical absorber to form strip electrodes, where the optical absorber functions as the primary conductor in the strip electrodes in optically active regions of the MEMS device, forming a sacrificial layer over the optical absorber, forming at least one support structure over the optical absorber, forming a conductive deformable layer over the sacrificial layer and the at least one support structure, and performing a release etch to remove the sacrificial layer, forming a cavity between the deformable layer and the optical absorber.

DETAILED DESCRIPTION OF THE PREFERRED EMBODIMENT

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Manufacturing processes for MEMS devices such as interferometric modulators may be designed to simplify the manufacturing process, or to adapt the manufacturing process to facilitate manufacturing in a thin-film transistor (TFT) fabrication facility or "fab," such as a flat-panel display fab, or a conventional LCD or OLED fab. Even greater simplification can be achieved by employing the same materials for multiple layers (e.g., MoCr or Mo for absorber and sacrificial layers), and the elimination of expensive transparent conductive oxides (e.g., ITO) from optical stacks for arrays small enough to employ an optical absorber to carry signals. In certain embodiments, the manufacturing process may incorporate materials, such as MoCr alloys, which are used in such manufacturing facilities. In other embodiments, materials such as alloys having specific compositions may be used to provide desired properties to the interferometric modulators or other MEMS devices.

Figure 1:
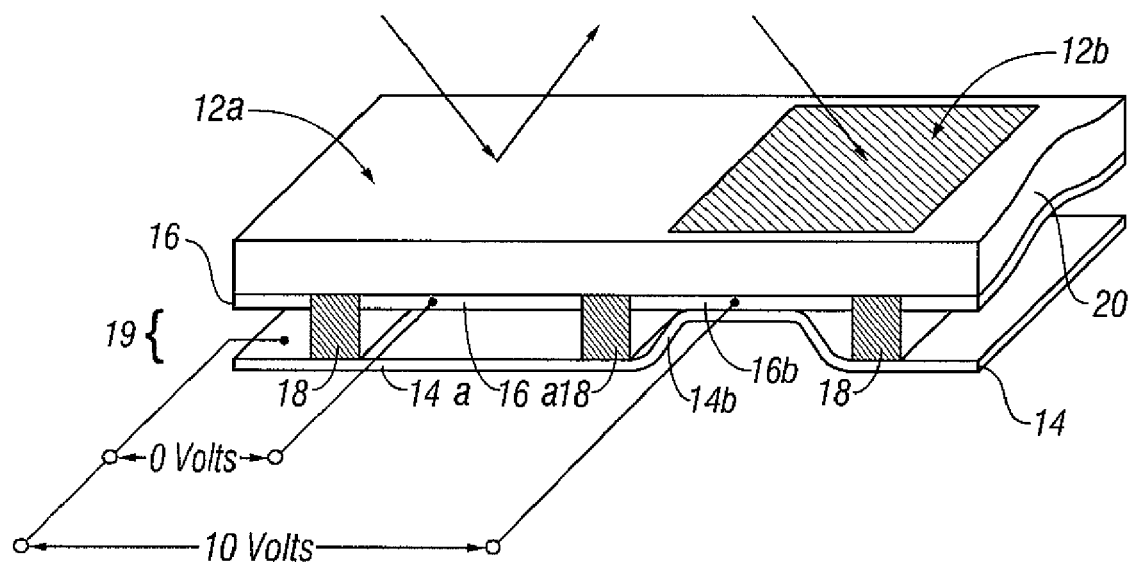
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
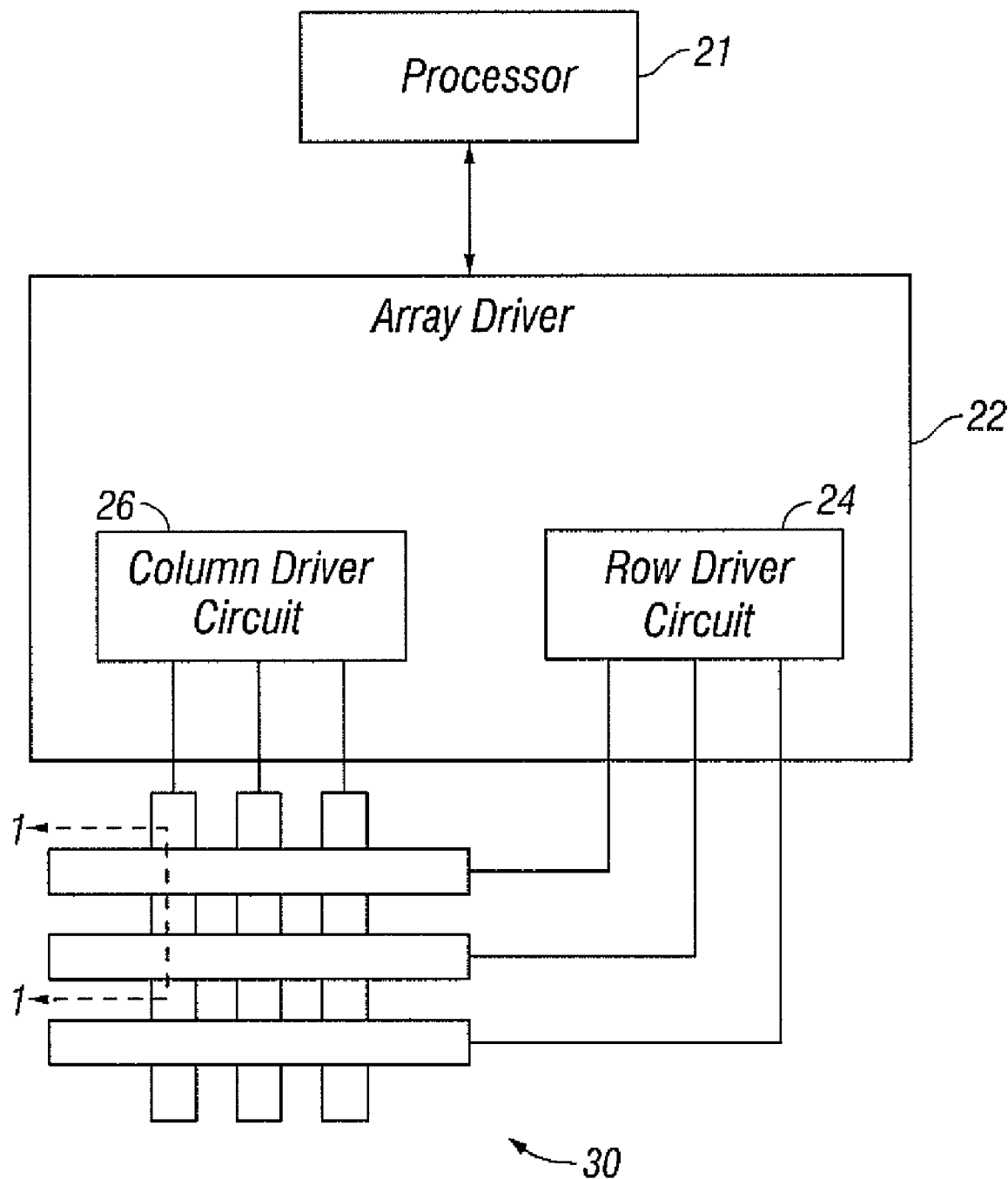
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
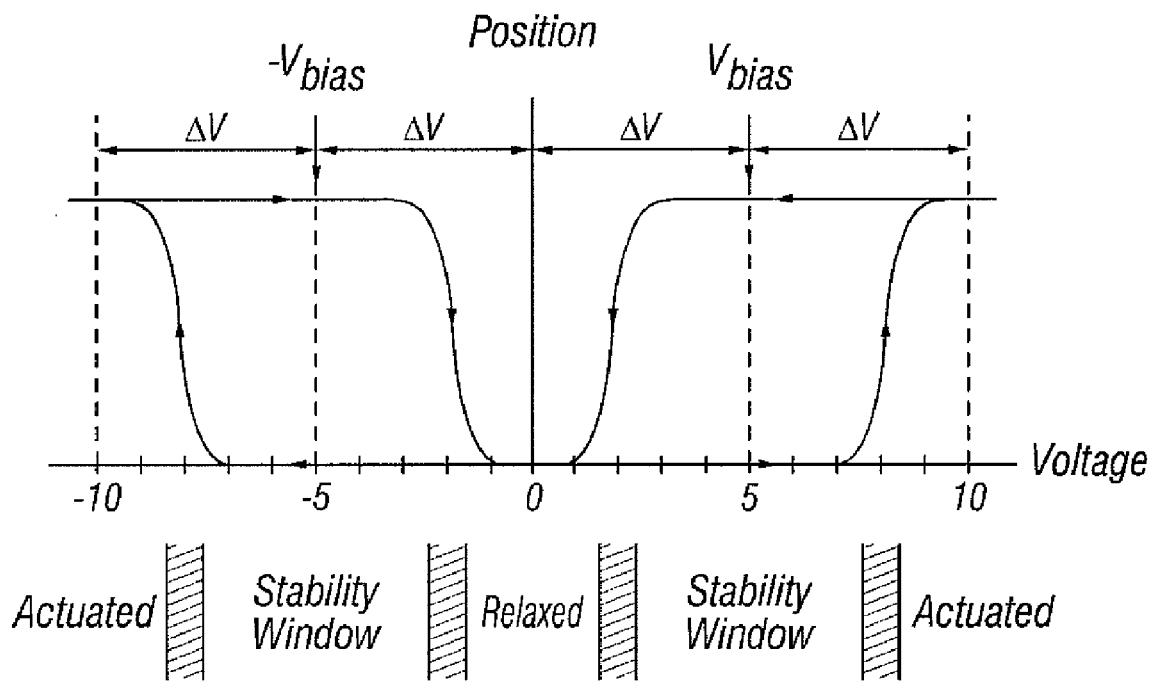
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
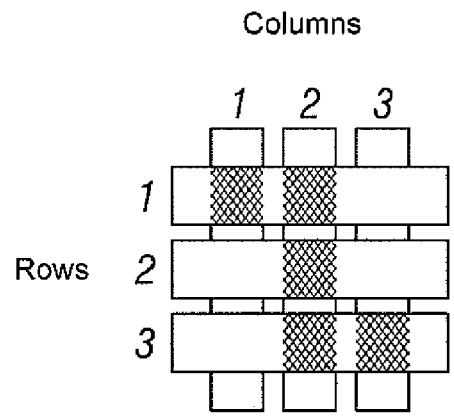
FIGS. 5A and 5B illustrate one exemplary timing diagram for row and column signals that may be used to write a frame of display data to the 3×3 interferometric modulator display of FIG. 2.
Figure 5B:
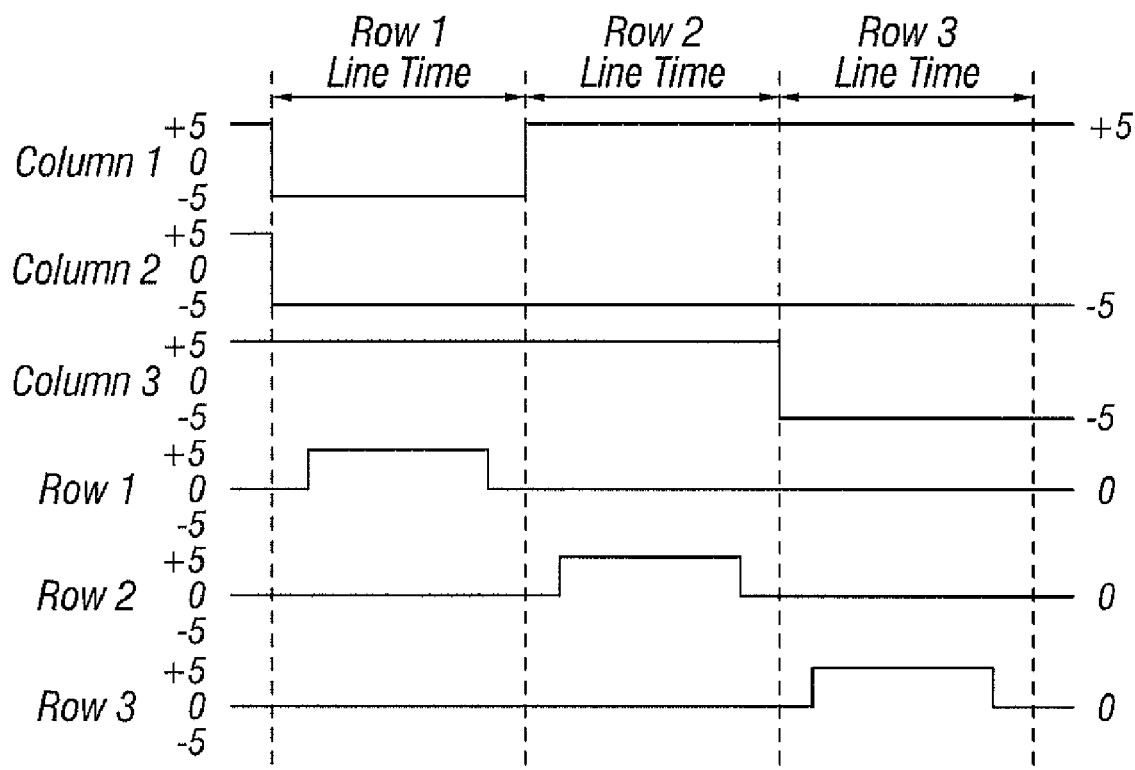

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
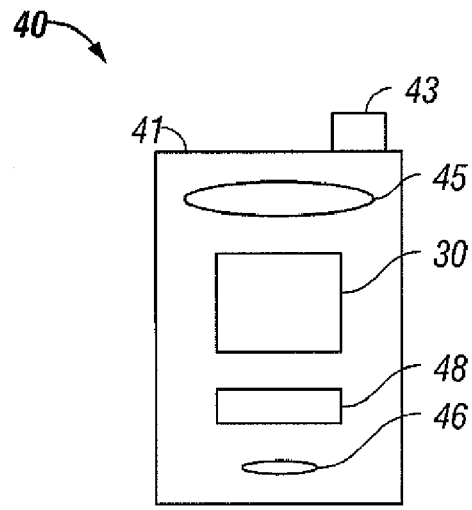
FIGS. 6A and 6B are system block diagrams illustrating an embodiment of a visual display device comprising a plurality of interferometric modulators.
Figure 6B:
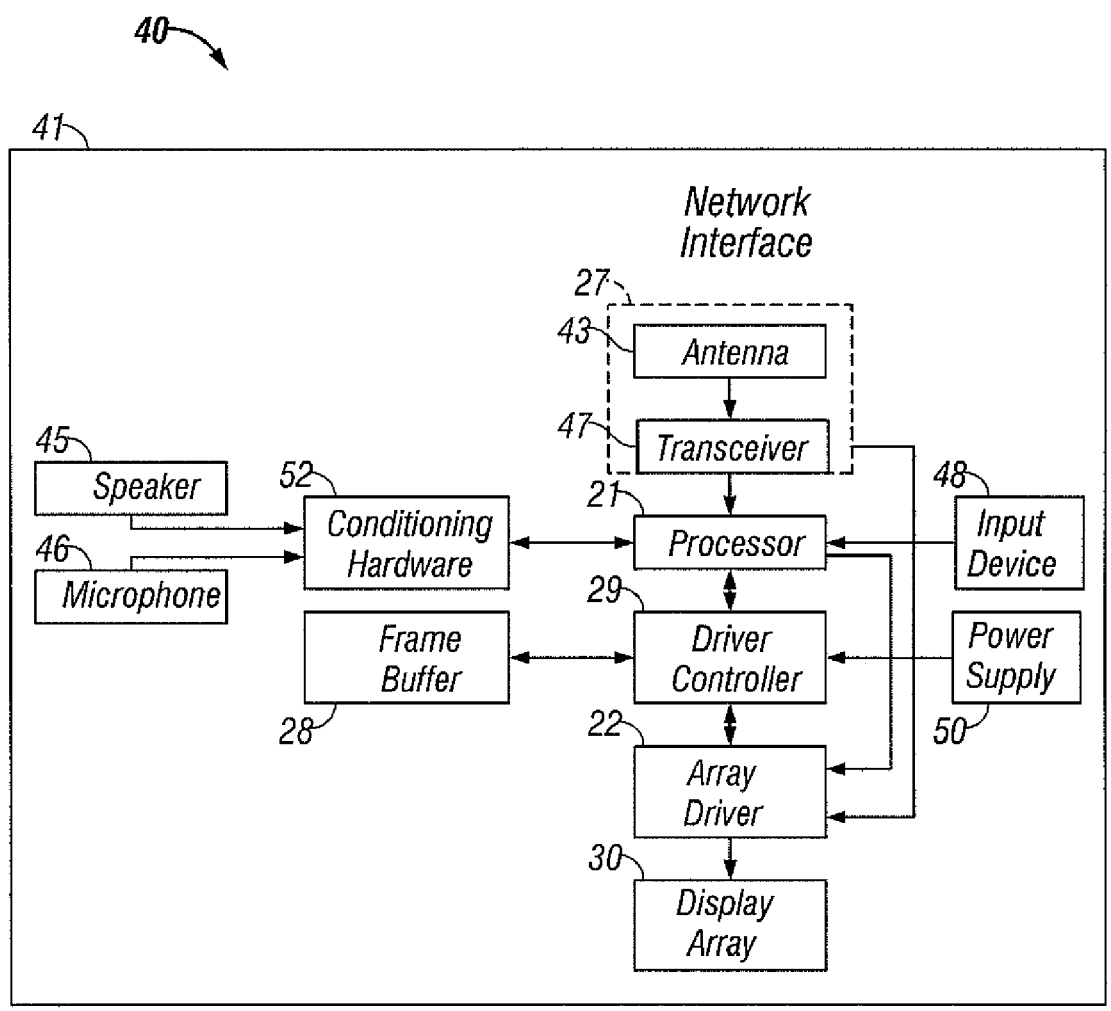

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, the network interface 27 can be replaced by an image source, which can store or generate image data to be sent to the processor 21. For example, the image source can be a digital video disc (DVD) or a hard-disc drive that contains image data, or a software module that generates image data.

The processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to the frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. The conditioning hardware 52 generally includes amplifiers and filters for transmitting signals to the speaker 45, and for receiving signals from the microphone 46. The conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, the driver controller 29 is a conventional display controller or a bi-stable display controller (e.g., an interferometric modulator controller). In another embodiment, the array driver 22 is a conventional driver or a bi-stable display driver (e.g., an interferometric modulator display). In one embodiment, the driver controller 29 is integrated with the array driver 22. Such an embodiment is common in highly integrated systems such as cellular phones, watches, and other small area displays. In yet another embodiment, the display array 30 is a typical display array or a bi-stable display array (e.g., a display including an array of interferometric modulators).

The input device 48 allows a user to control the operation of the exemplary display device 40. In one embodiment, the input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

The power supply 50 can include a variety of energy storage devices as are well known in the art. For example, in one embodiment, the power supply 50 is a rechargeable battery, such as a nickel-cadmium battery or a lithium ion battery. In another embodiment, the power supply 50 is a renewable energy source, a capacitor, or a solar cell, including a plastic solar cell, and solar-cell paint. In another embodiment, the power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
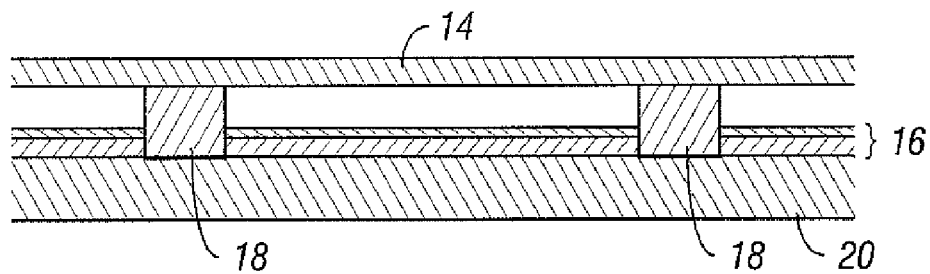
FIG. 7A is a cross section of the device of FIG. 1.
Figure 7B:
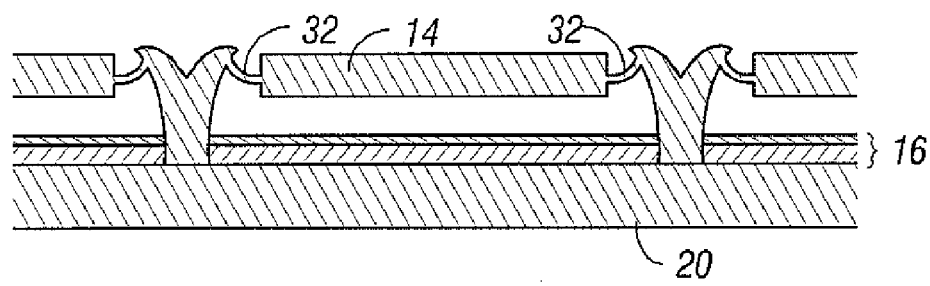
FIG. 7B is a cross section of an alternative embodiment of an interferometric modulator.
Figure 7C:
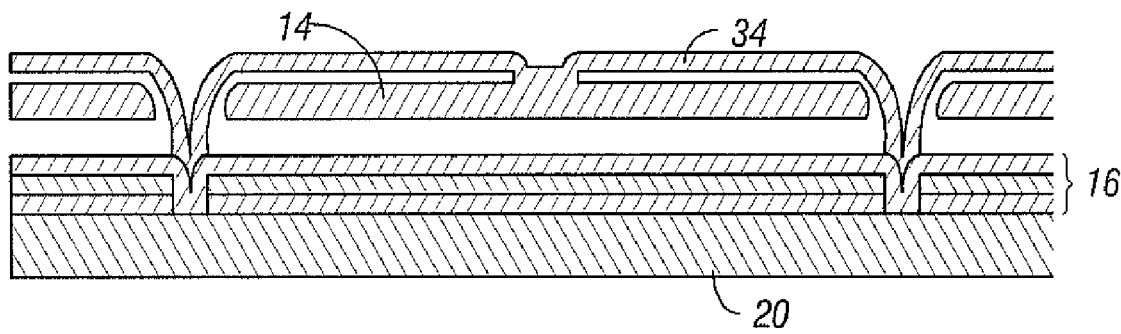
FIG. 7C is a cross section of another alternative embodiment of an interferometric modulator.
Figure 7D:
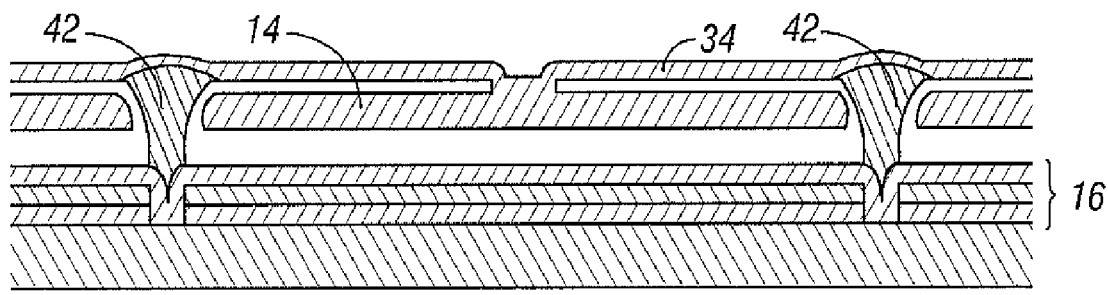
FIG. 7D is a cross section of yet another alternative embodiment of an interferometric modulator.
Figure 7E:
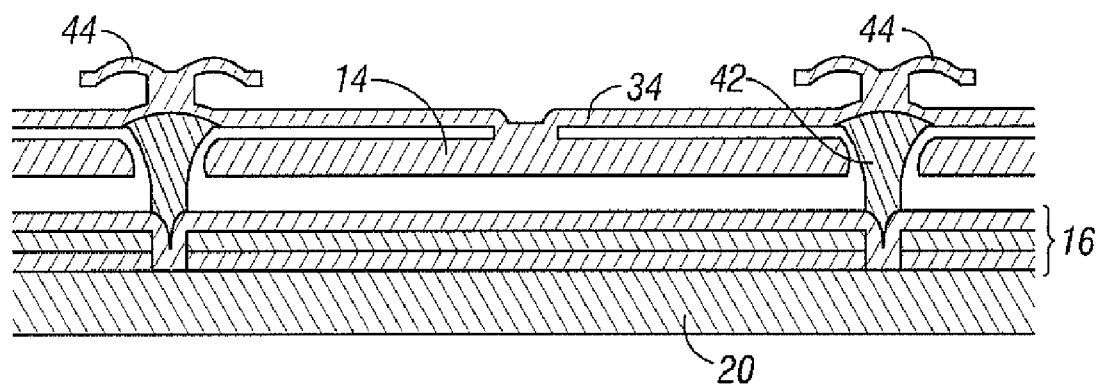
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has supports formed by support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. In other embodiments, supports can additionally or alternatively include continuous walls, such as support rails. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Additional structure may be provided within or adjacent an array of MEMS devices such as interferometric modulators. For examples, masks can minimize or prevent undesirable optical effects when the array is viewed, and bussing structures can improve conductivity throughout the array. In addition, specific materials may be used to achieve certain desired effects. The materials used may also be chosen to minimize the amount of different materials used to fabricate a device, so as to simplify the manufacturing process or to adapt the manufacturing process to specific manufacturing equipment already in place, such as at thin-film transistor (TFT) fabrication facilities or "fabs".

FIGS. 8A-8I illustrate a process flow which may be used to form an array of MEMS devices. In particular, the process flow is directed to the formation of an array of interferometric modulators, but the certain steps of the process flow, as well as certain materials used therein, may be used in the fabrication of other types of MEMS devices, as well.

Figure 8A:
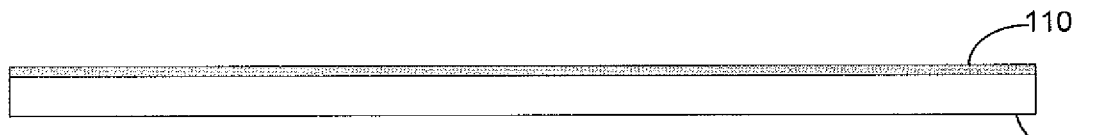
FIGS. 8A-8I are schematic cross sections of various steps in the fabrication of an interferometric modulator.

FIG. 8A illustrates a light-transmissive substrate 100 on which an blackmask absorber layer 110 is formed. In certain embodiments, the light-transmissive substrate 100 may be transparent or substantially transparent, and may comprise materials such as glass or a polymer. In certain embodiments, a fixed interferometric structure comprising two absorber layers spaced apart by a light transmissive layer to provide the desired spacing, may be used as an interferometric black mask, which appears dark due to the interferometric modulation of light incident upon the interferometric black mask. Although referred to as a black mask, the black mask need not appear black, but may appear some other color, such as gray, so long as the intensity of the light reflected back towards the viewer is reduced. In such embodiments, the blackmask absorber layer 110 is formed from a material and a thickness which is partially transmissive to incoming light, such that some incident light is reflected and some incident light is transmitted therethrough to underlying layers. In one embodiment, blackmask absorber layer 110 comprises a layer of a MoCr alloy having a thickness of about 70-75 Angstroms, although other suitable materials and thicknesses may be used. For example, as discussed in greater detail below, in certain embodiments the blackmask absorber layer may comprise a suitable thickness of molybdenum, and layers comprising only chromium may also be used. In one embodiment, the thickness and material of the blackmask absorber layer 110 are selected such that the reflectivity of the absorber layer to visible light is between 28.5% and 34.5%. In one embodiment, the blackmask absorber layer 110 is sputter deposited onto the substrate, although other suitable deposition methods may also be used.

In a particular embodiment, the MoCr layer may include about 2 atomic % chromium. In other embodiments, the MoCr layer may include between about 2 and 3 atomic % chromium. Inclusion of chromium in the molybdenum layer can increase the reflectivity of the layer. Higher levels of chromium may increase the difficulty of patterning the layer, and high levels of chromium may also be prohibited by regulations limiting the amount of chromium in certain devices. In other embodiments, the use of MoCr as an absorber layer may facilitate the fabrication of these materials in a TFT fab, such as a conventional LCD or OLED fab, or a flat panel display fab, as MoCr is commonly used as a gate material in such fabs.

Figure 8B:
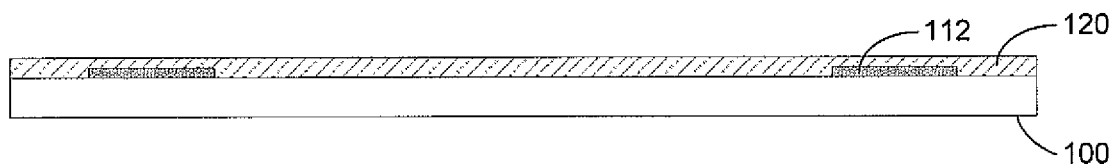

In FIG. 8B, the blackmask absorber layer 110 is patterned and etched to form blackmask absorber 112 and a blackmask dielectric layer 120 has been deposited over the blackmask absorber 112. Although illustrated as planar, it will be understood that depending on the material and deposition process, this and subsequently deposited layers may be deposited conformally over underlying layers and may not comprise a planar upper surface. In the illustrated embodiment, the blackmask absorber layer 110 may be formed from a conductive material, in some embodiments the blackmask dielectric layer 120 may remain substantially unpatterned, or the black mask dielectric layer 120 may be patterned to remove portions of the blackmask dielectric layer 120 not overlying the blackmask absorber 112. In some embodiments wherein the blackmask dielectric layer 120 serves as the spacer or optical cavity between two absorber layers in an interferometric black mask, the blackmask dielectric layer 120 may comprise $SiO_2$ having a thickness of roughly 800 angstroms, and may have a refractive index of roughly 1.46, although other suitable materials may also be used. In some embodiments, the layer 120 may have a thickness of between 760 and 840 angstroms, although layers which are thicker or thinner than that may also be used. It will be understood that the dielectric layer 120 thus defines the optical path of the interferometric blackmask, such that the thickness for the desired "color" will depend upon the refractive index of the chosen material. The blackmask dielectric layer 120 may be deposited via chemical vapor deposition, although other suitable methods may also be used. The thickness of the blackmask dielectric layer 120 may also be selected to facilitate conformal deposition of overlying layers, smoothing out any sharp edges in the underlying blackmask absorber layer 112.

Figure 8C:
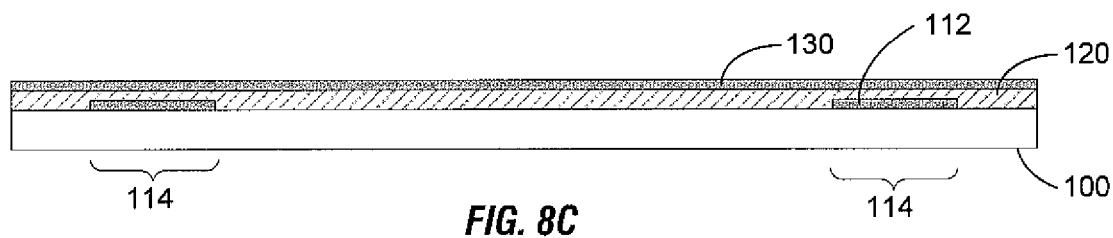

In FIG. 8C, an optical absorber 130 is deposited over the blackmask dielectric layer 120. In certain embodiments, the optical absorber may be formed from the same material as the blackmask absorber 112, and thus may be deposited using the same type of equipment. Thus, in some embodiments, the optical absorber 130 may comprise a layer of MoCr, and may have a thickness of 70-75 Angstroms. Because a MoCr optical absorber 130 is conductive, the deposition of a separate conductive layer to serve as an electrode may not be necessary, but in other embodiments a separate transparent conductive layer, such as indium-tin-oxide, may be deposited either over or under the optical absorber 130.

In certain embodiment, for small arrays of MEMS devices, such as arrays of interferometric modulators having rows or columns which are less than 40 pixels across (e.g., wherein the conductive layer formed by optical absorber 130 extends no more than 40 pixels), the deposition of a separate transparent conductive layer may be unnecessary for signal conduction or bussing, although depending on the size of the pixels and the materials being used, different sizes and shapes of MEMS arrays may be formed without a separate conductor layer. Thus, ITO or other transparent conductor is omitted from the illustrated embodiment. Because the optical absorber 130 may serve as the sole or primary conductor in the lower or row electrodes, the composition of the optical absorber layer 130 may be selected for its conductive, as well as optical, properties. As noted above, a MoCr layer including about 2 atomic % chromium may be used as the optical absorber 130, and may provide a layer having a suitable conductivity. Although the inclusion of additional chromium may increase the conductivity, it has been found to have undesirable effects in integration, such as complicating etching for patterning the row electrodes. A subsequent patterning step may then be performed to pattern the optical absorber 130 to form a desired pattern (not shown), such as the formation of strip electrodes to define row electrodes for the array. When no transparent conductive layer is deposited adjacent the optical compensation layer 130, the optical compensation layer may serve as the primary or sole conductor in at least portions of such strip electrodes.

The optical absorber 130 may serve two optical functions in different portions of the array. In blackmask areas 114 in which the optical absorber 130 overlies the black mask absorber 130, the optical absorber and the blackmask absorber cooperate to form an interferometric black mask, as discussed above. Given particular dimensions and materials, the fixed element will absorb a large amount of incident light, functioning as a black mask and preventing overlying structures from reflecting light. As the blackmask areas 114 will reflect a particular color or light (or absorb light) regardless of the state of the MEMS array, these areas may be referred to as optically inactive. In certain embodiments, much of the light is absorbed, but the amount of light which is reflected can be controlled by varying the thickness and opacity of the absorber layers. A variance in the amount of light reflected can affect the contrast ratio of a display device incorporating such an array.

In the optically active areas, such as those located away from the blackmask areas 114, the optical absorber 130 may serve as, for example, a partially reflective layer in an interferometric modulator, such as the partially reflective layer in the optical stack 16 of FIG. 1. Thus, the optical absorber 130 serves as the partially reflective and partially transparent layer in an interferometric modulator which may reflect one or more of various colors. The inclusion of Mo may also provide better color performance for certain colors, as optical absorbers which include Mo, such as MoCr, may provide a better red color than interferometric modulators having a Cr optical absorber.

Figure 8D:
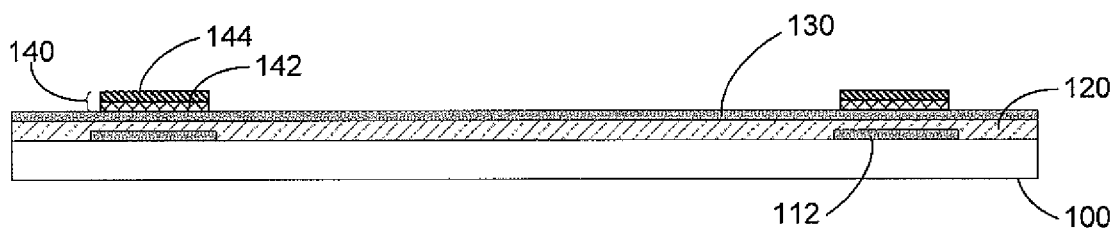

In FIG. 8D, a bussing layer is deposited over the optical absorber 130, and patterned to form a bussing structure 140. The bussing structure may comprise a material or thickness which provides better conductivity than the optical absorber 130 or other conductive layer. In the particular embodiment depicted in FIG. 8D, the bussing structure includes a lower sublayer 142 and an upper sublayer 144. It will also be understood that the bussing layer may extend outside the array, and may permit electrical communication between components within the array and external components, such as contact pads or driver circuitry.

In certain embodiments, the lower sublayer 142 comprises Al and the upper sublayer 144 comprises Ni, and in a particular embodiment, the lower sublayer 142 comprises an Al—Nd alloy and the upper sublayer 144 comprises a Ni—B alloy. As will be discussed in greater detail below, the Al—Nd alloy may comprise roughly 2% neodymium, and the Ni—B alloy may comprise roughly 0.1% to 0.5% Boron. These particular alloys may be used in other layers in the MEMS device, as well.

As can be seen in FIG. 8D, the bussing structure 140 may overlie a portion of the blackmask area 114 defined by the blackmask absorber 112. Because the blackmask area 114 minimizes optical interference from overlying layers, reflective materials such as Al may be used in the bussing structure 140 without causing undesirable optical effects. Thus, in certain embodiments, the bussing structure may serve as a conductor within optically inactive areas of the display, such as the blackmask areas 114 within the array or as interconnects in the routing area outside the array, and a conductive optical absorber layer 130 may serve as the primary or sole conductor in the strip electrodes in certain optically active areas of the display. The use of a bussing structure 140 in optically inactive areas can compensate for lower conductivity in optically active areas, such that a transparent conductive layer such as ITO is not required.

Figure 8E:
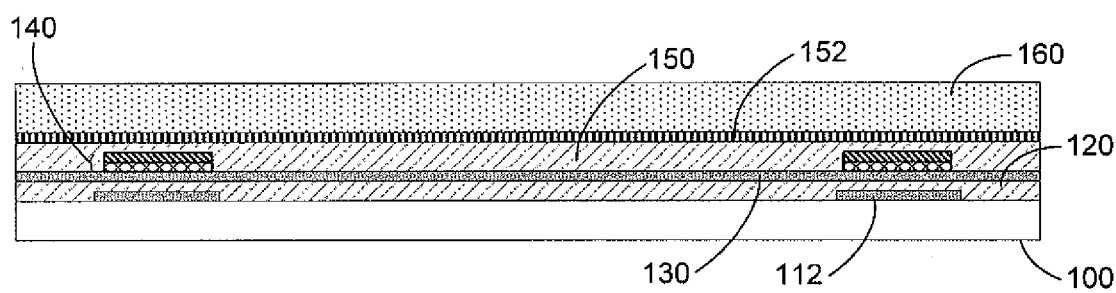

In FIG. 8E, an optical dielectric layer 150 has been deposited over the bussing structure 140, followed by an etch barrier layer 152 and a sacrificial layer 160. In certain embodiments, the optical dielectric layer 150 may comprise the same material as the blackmask dielectric layer 120. In a particular embodiment, the optical dielectric layer 150 comprise a layer of $SiO_2$, which may be deposited via chemical vapor deposition, and may have a thickness of between 380 and 440 angstroms, although other suitable materials, thicknesses, and deposition techniques may be used. The thickness and material (refractive index) of the optical dielectric layer is selected to define the interferometric color reflected by the finished interferometric modulator when in the collapsed state (see FIG. 1). The etch barrier layer 152 may comprise a variety of materials depending on the particular etches to be used and the composition of adjacent layers, such as the sacrificial layer 160. In one embodiment, the etch barrier layer may be resistant to a $XeF_2$ etch, although different materials may be used depending on release or other etch chemistry to be used later in the manufacturing process. In one embodiment, the etch barrier layer comprises an $Al_xO_y$ layer having a thickness of roughly 80 angstroms, and which may be sputter deposited onto the optical dielectric layer 150 although other thicknesses and materials may be used.

The height of sacrificial layer 160 will affect the size of the interferometric cavity formed when the sacrificial layer is removed, which in turn affects the color reflected by the interferometric modulator when a movable reflective layer is in the relaxed, or unactuated, position, such as the movable reflective layer 14a of FIG. 1. FIG. 8E depicts a sacrificial layer 160 having a substantially constant height. It will be understood that in other embodiments, the sacrificial layer 160 may have a varying height. For example, the sacrificial layer 160 may have different heights in areas corresponding to distinct pixels which will reflect different interferometric colors in the relaxed positions. Such a sacrificial layer may be formed, for example, through an iterative deposition and patterning process. In a particular embodiment of a monochrome array which reflects greenish-yellow light when the movable reflective layers are in the unactuated position, a sacrificial layer 160 may comprise a layer of molybdenum sputter deposited over the etch barrier layer 152, and having a thickness of between about 1715 and 1855 angstroms. It will be understood, however, that different thicknesses may be used to obtain different colors of monochrome arrays.

Figure 8F:
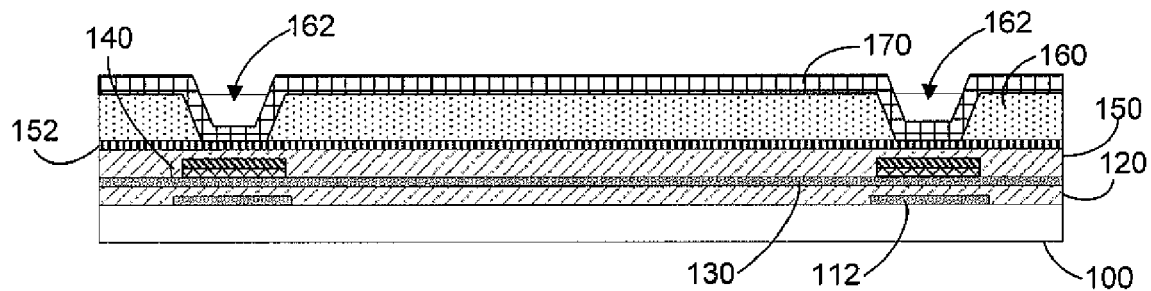

In FIG. 8F, it can be seen that the sacrificial layer 160 is patterned to form apertures 162 extending through the sacrificial layer 160 and a layer 170 of support post material has been subsequently deposited over the sacrificial layer 160. In the illustrated embodiment, these apertures 162 take the form of tapered apertures extending through the sacrificial layer 160 to the underlying layer, in this case etch barrier layer 152. As can be seen, the taper of the apertures facilitates conformal deposition of the support post layer 170. In one embodiment, the support post material comprises a layer of $SiO_2$ deposited via chemical vapor deposition and having a thickness of about 4360 to 4520 angstroms, although other materials, thicknesses, and deposition processes may be used. In particular the thickness of the support post layer 170 may depend on the material used to form the layer, as well as the desired mechanical properties of the resultant support post.

Figure 8G:
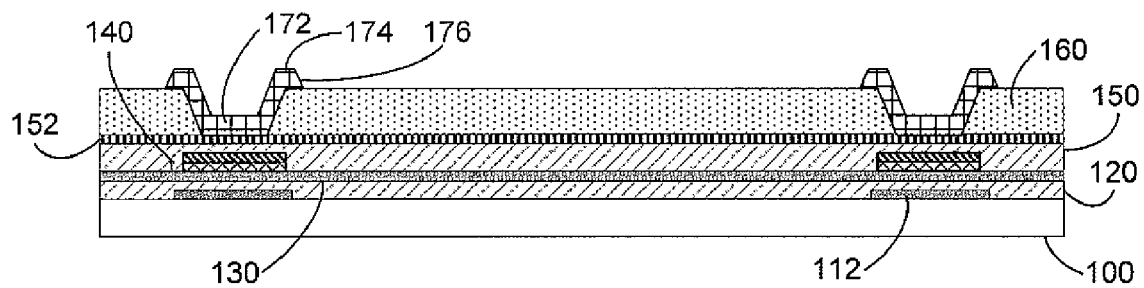

In FIG. 8G, the support post layer 170 has been patterned and etched to form support structures 172, which may take a variety of shapes throughout the array of MEMS devices. FIG. 8G depicts support structures 172 having a substantially horizontally extending wing portion 174 having tapered edges 176. The horizontally extending wing portion 174 can be used to control the height and behavior of overlying layers (e.g., the mechanical and mirror layers to be described below), by varying the size of the wing portion 174. The tapered edges 176 facilitate continuous and conformal deposition of overlying layers.

In addition, the steps described with respect to FIG. 8G may be followed by a processing step in which the exposed portion of sacrificial layer 160 is treated prior to deposition of the deformable reflective layer 180 (see FIG. 8H below). Treatment of the sacrificial layer, such as for example the formation of a textured surface and/or the modification of the surface energy, will result in the deformable reflective layer 180 having a textured surface and/or modified surface energy when the sacrificial layer 160 is later removed. The formation of a deformable reflective layer 180 having, for example, a textured lower surface may prevent or delay the onset of stiction between the deformable reflective layer 180 and the underlying layers.

In a particular embodiment, the sacrificial layer 160 may be treated by an $N_2O$ plasma treatment process. After patterning the post layer 170 to form support structures 172, thereby exposing portions of the sacrificial layer 160 located away from the posts, a plasma environment comprising $N_2O$ may be created, and the partially fabricated array exposed to the $N_2O$ plasma environment for a period of time. In certain embodiments, the exposure may have a duration of between 30 seconds and 5 minutes, but in other embodiments longer or shorter exposure times may be used. In certain embodiments in which the post structures are formed within a dry-etch chamber, the plasma environment may be created inside the same dry-etch chamber. It will be understood that this treatment may in other embodiments be performed prior to post formation, such as prior to the initial patterning of the sacrificial layer 160 to form apertures 162.

Figure 8H:
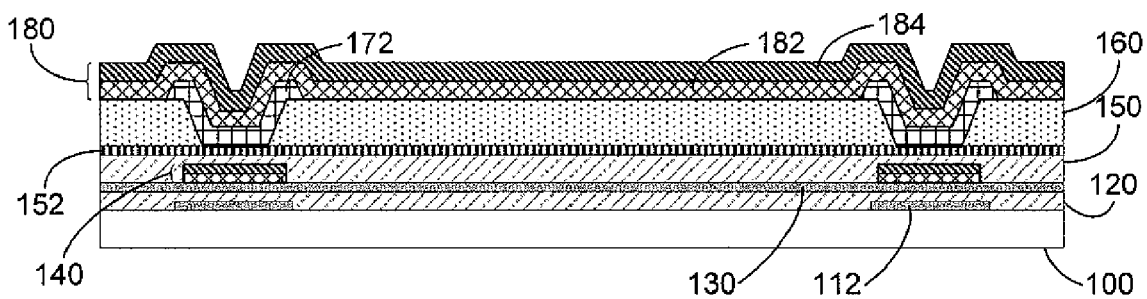

In FIG. 8H, a deformable reflective layer 180 is formed over the support structures 172. The deformable reflective layer 180 comprises a reflective sublayer 182 and a mechanical sublayer 184 formed over the reflective sublayer 182. Generally, the reflective sublayer 182 may comprise a material selected primarily for its optical properties, and the mechanical sublayer may comprise a material selected primarily for its mechanical properties.

In certain embodiments, the reflective sublayer may comprise aluminum, and the mechanical sublayer may comprise nickel. The presence of the neodymium in the reflective layer inhibits aluminum migration which may lead to discolorations in the form of blue spots on the aluminum layer, which spots may cause an undesirable optical effect. The presence of roughly 2 atomic % neodymium in the reflective layer is sufficient to inhibit aluminum migration, but the inclusion of additional neodymium may reduce the reflectivity of the reflective sublayer and significantly increase the resistance of the reflective sublayer. Accordingly, the Nd in the reflective sublayer can be selected to be below 2.5 atomic % of the aluminum film, particularly between about 0.5 atomic % and 2.5 atomic %.

In particular embodiments, the reflective sublayer may comprise an Al—Nd alloy, and in a specific embodiment may comprise a sputter-deposited Al—Nd alloy comprising roughly 2 atomic % neodymium. In a specific embodiment the reflective sublayer may have a thickness of between about 300 and 400 angstroms. In particular embodiments, the mechanical sublayer may comprise a Ni—B alloy, and in a specific embodiment may comprise a sputter-deposited Ni—B alloy comprising roughly 0.1-0.5 atomic % boron and having a thickness of about 750 to 850 angstroms. The inclusion of boron in the mechanical layer increases the stiffness of the mechanical layer. An increase in the stiffness of the optical layer can help to delay or prevent a reduction in the restoring force of the mechanical layer, which reduction could lead to pixels failing to release at expected voltages. In addition, a stiffer mechanical layer may require fewer support structures throughout the array, such that more of the array can be optically active and not masked by the blackmask. In embodiments which include bussing structures 140, the increase in active area from the reduction of posts may offset the loss in active area due to the masking of the bussing structures. The use of a relatively small amount of boron, roughly 0.5 atomic %, avoids significant boron diffusion into adjacent layers, including the optical dielectric and absorber layers, which diffusion may cause undesirable electrical effects.

In embodiments in which a Ni—B alloy is deposited over an Al—Nd alloy, such as in the bussing structure 140 or the deformable reflective layer 180, deposition of the Ni—B layer may result in the formation of an intermetallic alloy between the two layers which may have undesirable electrical properties. The formation of this intermetallic alloy may also occur between any Al-containing layer and any Ni-containing layer. In order to avoid or minimize the formation of this intermetallic alloy, a vacuum break may be used between deposition of the underlying layer (in this case the Al—Nd layer) and the deposition of the overlying layer (in this case the Ni—B layer). Exposing the recently deposited Al—Nd layer to clean room air promotes the formation of $Al_xO_y$ native oxides on the surface of the Al—Nd layer, which may inhibit the formation of the intermetallic alloy upon deposition of the overlying Ni—B layer, and may have more desirable electrical properties than the intermetallic alloy.

Figure 8I:
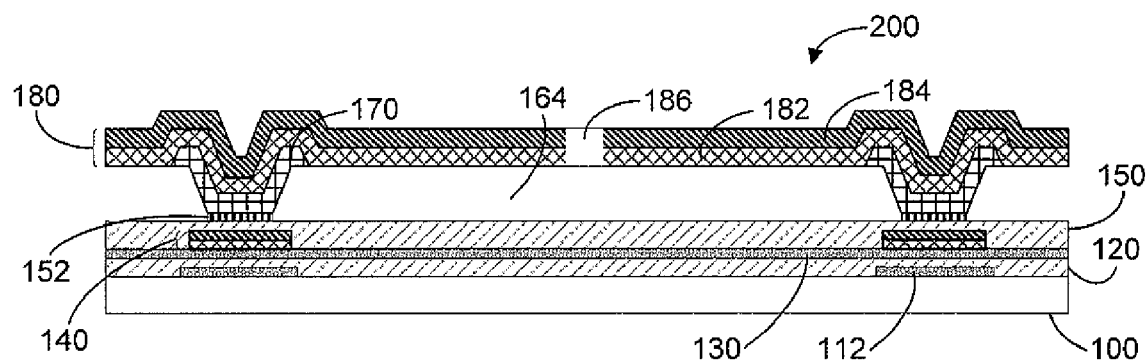

Finally, in FIG. 8I, it can be seen that the deformable reflective layer 180 has been patterned to form desired structures, and that a release etch has been performed to remove the sacrificial layer 160, forming a cavity 164 between the deformable reflective layer 180 and the underlying layers. In certain embodiments, etch holes 186 may be formed in the reflective deformable layer 180 to expose additional portions of the sacrificial layer 160 to the etchant. In addition, the deformable reflective layer may be etched to form additional features (not shown) such as column strip electrodes and conductive leads between the array and contact pads outside of the array.

Some of etch barrier layer 152 (shown as partially removed in FIG. 8I) may be consumed during this release etch process, although some may remain in the finished device. In certain embodiments, a XeF$_2$ release etch may be used to remove a Mo sacrificial layer without substantially etching an Al$_x$O$_y$ etch barrier layer. Although shown in FIG. 8I as removed in the areas between support structures 172, it will be understood that some portion of the etch barrier layer 152 may remain in those areas. An interferometric modulator 190 is thus formed, in which the deformable reflective layer 180 is electrostatically actuatable towards the underlying layers in order to alter the wavelengths of light reflected by the interferometric modulator 190.

Figure 9:
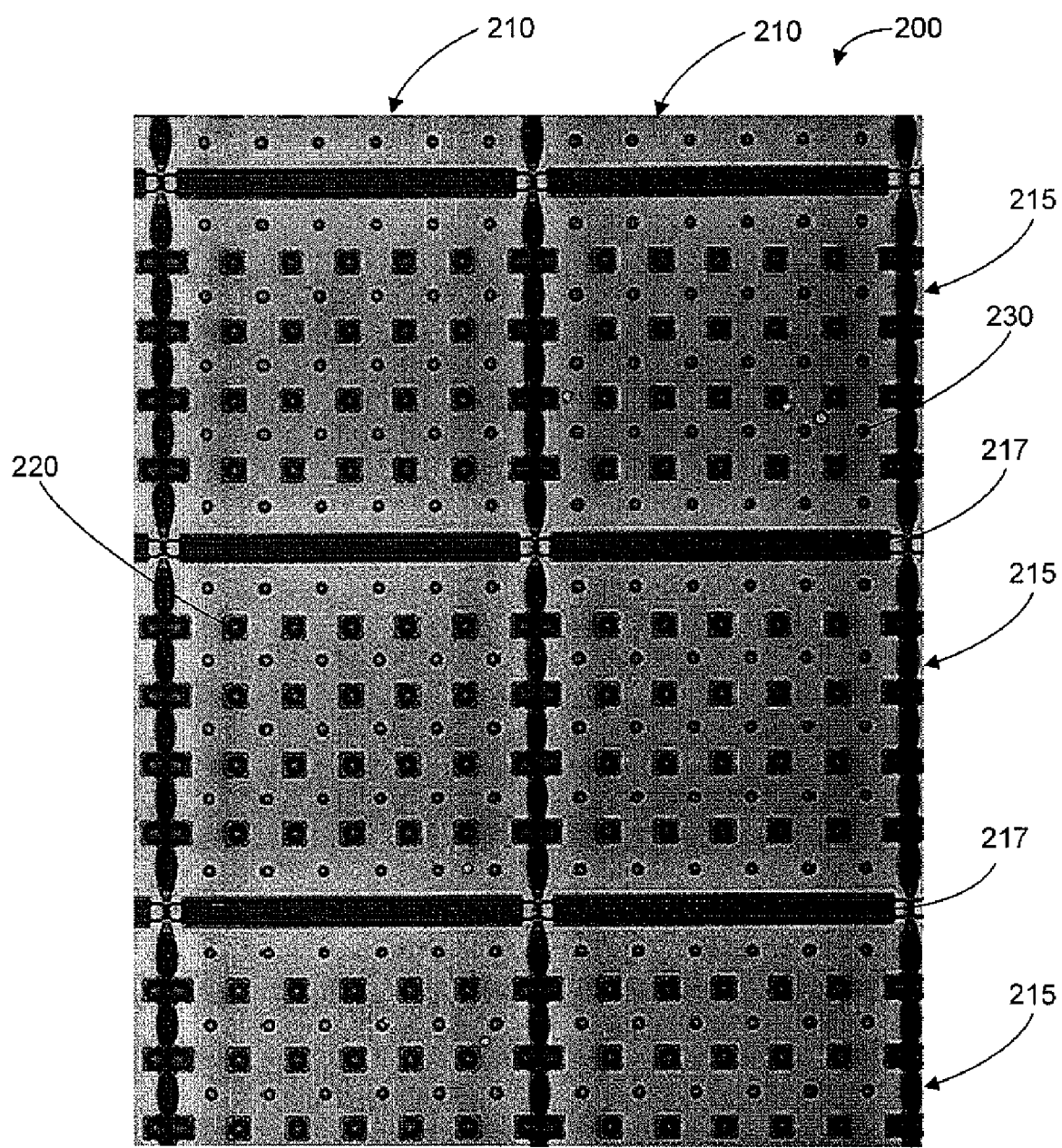
FIG. 9 is a bottom plan view of an unactuated array of interferometric modulators.

FIG. 9 illustrates a view from beneath an array 200 of interferometric modulators. It can be seen that the deformable reflective layer 180 (see FIG. 8I) has been patterned to form column electrodes 210. Conductive layers located below the air gap have been patterned to form row electrodes 215, delineated in FIG. 9 by rail supports 217, which permit actuation of specific portions of the deformable reflective layer 180. Support structures, which may take the form of elongated rails between row electrodes or posts within a particular pixel, are masked by black mask areas 220 which appear dark. In addition, etch holes 230 (similar to the etch holes 186 of FIG. 8I) can be seen throughout the array as dark spots, as well. Upon actuation of the deformable reflective layer, causing portions of the column electrodes 210 to move towards the row electrodes 215, the actuated portions of the array may appear dark throughout the array. It will be understood, however, that different configurations may be used, such that the array is switchable between reflecting a first color in an unactuated position, and a second color in an actuation position, and that the actuated position need not cause a dark state if different dimensions or materials are utilized.

In certain embodiments, the process flow set forth in the following table may be used in the fabrication of MEMS devices:

TABLE 1

| Mask | Process | Material | Specification | Deposition Method |
|---|---|---|---|---|
| Mask 1 (blackmask) | Deposit blackmask absorber | MoCr | Reflectance = 28.5%-34.5% | Sputter |
| | Pattern and etch blackmask stack | | | |
| | Deposit blackmask dielectric | SiO$_2$ | Thickness = 800 Å ± 10% RI = 1.46 ± 0.02 | PECVD |
| | Deposit Optical Stack: | | | |
| | Deposit transparent conductor | N/A | N/A | |
| | Deposit optical absorber | MoCr | Reflectance = 28.5%-34.5% | Sputter |
| | Routing material | N/A | N/A | |
| Mask 2 (optical stack/ rows) | Pattern and etch optical stack to form rows | | | |
| | Deposit Dielectric Stack: | | | |
| | Deposit dielectric | SiO$_2$ | Thickness = 410 Å ± 40 Å RI = 1.46 ± 0.02 | PECVD |
| | Deposit XeF$_2$ Etch Stop | AlO$_x$ | 80 Å ± 5% | Sputter |
| Mask 3 (Contact cut) | Pattern dielectric stack to open contact pads | | | |
| | Deposit sacrificial layer | Mo | Thickness = 2000 Å ± 80 Å | Sputter |
| Mask 4 (sac) | Pattern/etch sac layer | | | |
| | Deposit post material | SiO$_2$ | Thickness = 4400 Å ± 100 Å | PECVD |
| Mask 5 (post) | Pattern and etch post layer | | | |
| | Deposit Mechanical Layer: | | | |
| | Deposit reflector | Al—Nd | T = 300 Å ± 8% | Sputter |
| | Deposit mechanical layer | Ni | T = 1000 Å ± 8% | Sputter |
| Mask 6 (mech) | Pattern and etch mechanical layer | | | |

In the process flow of Table 1, the materials used, such as MoCr and SiO$_2$, are readily available in thin-film transistor fabrication facilities, and many materials are used in multiple layers, simplifying the fabrication process. It can also be seen that the above process may be usable when fabricating display sizes which do not require additional conductors, and thus do not include a separate transparent conductor or routing material. The deposition of AlO$_x$ (or Al$_x$O$_y$) as an etch stop layer can be readily implemented in a thin-film transistor fabrication facility. The Al—Nd alloy used in the reflector is selected for its resistance to aluminum migration, among other properties, and the nickel is selected for its mechanical strength and reliability.

In another embodiment, an alternate process flow using similar materials and thicknesses is described in the below table:

TABLE 2

| Mask | Process | Materials | Specification | Deposition Method |
|---|---|---|---|---|
| Mask 1 (blackmask) | Deposit blackmask absorber Pattern and etch blackmask stack | MoCr | Reflectance = 31.5% ± 3% | Sputter |
|  | Deposit blackmask dielectric | $SiO_2$ | Thickness = 800 Å ± 5% RI = 1.46 ± 0.02 | PECVD |
| Mask 2 (MoCr) | Deposit optical absorber Patter and etch optical absorber | MoCr | Reflectance = 29%~33% | Sputter |
|  | Routing material | Al—Nd Ni—B | Al = 100 Å ± 40 Å NiB ± 40 Å | Sputter |
| Mask 3 (routing/bus) | Pattern and etch routing/ bussing layer Deposit Dielectric Stack: |  |  |  |
|  | Deposit dielectric | $SiO_2$ | Thickness = 410 Å ± 30 Å RI = 1.46 ± 0.02 | PECVD |
|  | Deposit XeF2 Etch Stop | $AlO_x$ | 80 Å ± 5% | Sputter |
|  | Deposit sacrificial layer | Mo | Thickness = 1785 Å ± 70 Å | Sputter |
| Mask 4 (sac) | Pattern/etch sac layer |  |  |  |
|  | Deposit post material | $SiO_2$ | Thickness = 4440 Å ± 80 Å | PECVD |
| Mask 5 (post) | Pattern and etch post layer Deposit Mechanical Layer: |  |  |  |
|  | Deposit reflector | Al—Nd | T = 300 Å ± 50 Å | Sputter |
|  | Deposit mechanical layer | Ni—B | T = 800 Å ± 50 Å | Sputter |
| Mask 6 (mech) | Pattern and etch mech layer |  |  |  |
| Mask 7 (pad mask) | Pattern and etch to clear contact pads |  |  |  |

In the above process flow, Ni—B alloy is used in both the routing/bussing layer and the mechanical layer, simplifying the process flow, and a final step of patterning and etching to clear contact pads which may be utilized in certain embodiments. The variance in thickness of layers such as the bussing layer and the sacrificial layer across a plate may in certain embodiments be below a certain level, as well. For example, the variance in thickness of the bussing layer may be below 180 Å, and may typically be on the order of 30 Å. Similarly, the variance in thickness of the sacrificial layer may be below 200 Å and may typically be on the order of 30 Å.

As noted above, certain materials may be used in place of the materials discussed above. In the above embodiments, MoCr is utilized as the blackmask absorber 112 and optical absorber 130. In alternate embodiments, the blackmask and optical absorbers in the above tables may comprise molybdenum in an appropriate thickness to yield the desired reflectivity, without the addition of chromium. In certain embodiments, the blackmask and optical absorbers may comprise molybdenum having a thickness of about 60 to 70 angstroms, although other materials and thicknesses may also be used. In this embodiment, a single type of deposition tool can be employed to deposit all three of the blackmask, optical absorber, and sacrificial layer.

It will be understood that various combinations of the above embodiments are possible. It will also be recognized that the order of layers and the materials forming those layers in the above embodiments are merely exemplary. Moreover, in some embodiments, other layers, not shown, may be deposited and processed to form portions of an MEMS device or to form other structures on the substrate. In other embodiments, these layers may be formed using alternative deposition, patterning, and etching materials and processes, may be deposited in a different order, or composed of different materials, as would be known to one of skill in the art.

In particular, as discussed above, the height of various layers may be altered in order to control the wavelengths of light reflected by the interferometric modulator when in the actuated position. In particular, as the height of the sacrificial layer will affect the height of the resulting cavity when the sacrificial layer is removed, the sacrificial layer thickness may be altered to control the color reflected by an interferometric modulator.

It is also to be recognized that, depending on the embodiment, the acts or events of any methods described herein can be performed in other sequences, may be added, merged, or left out altogether (e.g., not all acts or events are necessary for the practice of the methods), unless the text specifically and clearly states otherwise. For example, as noted above, certain embodiments may not include the bussing structure discussed above, particularly when the display is sufficiently small.

While the above detailed description has shown, described, and pointed out novel features of the invention as applied to various embodiments, it will be understood that various omissions, substitutions, and changes in the form and details of the device of process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. An optical MEMS device, comprising:
 a conductive optical absorber formed over a substrate and patterned to form strip electrodes, wherein the optical absorber serves as the primary conductor in said strip electrodes within optically active areas of the MEMS device;
 at least one support structure formed over the optical absorber; and
 a conductive deformable layer formed over the at least one support structure and spaced apart from the conductive optical absorber, wherein the deformable layer is electrostatically deflectable towards the optical absorber, and wherein the MEMS device functions as an interferometric modulator.

2. The MEMS device of claim 1, wherein the optical absorber comprises a molybdenum-chromium alloy comprising about 2 atomic % chromium.

3. The MEMS device of claim 2, wherein the optical absorber has a thickness of about 70-75 angstroms.

4. The MEMS device of claim 1, wherein the optical absorber reflects between about 28.5% and 34.5% of incident visible light.

5. The MEMS device of claim 1, additionally comprising a blackmask absorber layer underlying at least a portion of the optical absorber, wherein the blackmask absorber comprises the same material as the optical absorber.

6. The MEMS device of claim 5, wherein the MEMS device comprises a sacrificial layer between the deformable layer and the optical absorber, wherein the sacrificial layer comprises the same material as the optical absorber and blackmask absorber.

7. The MEMS device of claim 6, wherein each of the sacrificial layer, optical absorber, and blackmask absorber comprise a layer of molybdenum.

8. The MEMS device of claim 5, wherein at least the blackmask absorber and the optical absorber form an interferometric black mask that absorbs a portion of incident light.

9. The MEMS device of claim 5, wherein the blackmask absorber is located in optically inactive areas of the display.

10. The MEMS device of claim 5, wherein at least a portion of the blackmask absorber layer underlies a portion of said at least one support structure.

11. The MEMS device of claim 1, wherein the deformable layer comprises a reflective sublayer facing the optical absorber and a mechanical sublayer overlying the reflective sublayer, wherein the reflective sublayer comprises aluminum and the mechanical sublayer comprises nickel.

12. The MEMS device of claim 11, wherein the reflective sublayer comprises an aluminum-neodymium alloy.

13. The MEMS device of claim 12, wherein the aluminum-neodymium allow comprises about 2 atomic % neodymium.

14. The MEMS device of claim 11, wherein the mechanical sublayer comprises a nickel-boron alloy.

15. The MEMS device of claim 14, wherein the nickel-boron alloy comprises about 0.5 atomic % boron.

16. The MEMS device of claim 11, additionally comprising a conductive bussing structure in electrical communication with the optical absorber layer.

17. The MEMS device of claim 16, wherein the bussing structure comprises a first sublayer and a second sublayer, wherein the first sublayer comprises the same material as the reflective sublayer of the deformable layer, and wherein the second sublayer comprises the same material as the mechanical sublayer of the deformable layer.

18. The MEMS device of claim 1, additionally comprising an optical dielectric layer located over at least a portion of the optical absorber, wherein the optical absorber comprises the only conductive material located between the optical dielectric layer and the substrate in the optically active areas of the display.

19. The MEMS device of claim 1, where the MEMS device does not comprise ITO in an optically active area of the display.

20. A method of fabricating an optical MEMS device, comprising:
    forming a blackmask absorber layer over a substrate;
    forming a conductive optical absorber over the substrate after forming the blackmask absorber layer, wherein the blackmask absorber layer comprises the same material as the optical absorber;
    patterning the conductive optical absorber to form strip electrodes, wherein the optical absorber functions as the primary conductor in said strip electrodes in optically active regions of the MEMS device;
    forming a sacrificial layer over the optical absorber;
    forming at least one support structure over the optical absorber;
    forming a conductive deformable layer over the sacrificial layer and the at least one support structure; and
    performing a release etch to remove the sacrificial layer, forming a cavity between the deformable layer and the optical absorber.

21. The method of claim 20, wherein the optical absorber comprises a molybdenum-chromium alloy comprising about 2 atomic % chromium.

22. The method of claim 20, wherein the optical absorber has a thickness of about 70-75 angstroms.

23. The method of claim 20, wherein the optical absorber reflects between about 28.5% and 34.5% of incident visible light.

24. The method of claim 20, additionally comprising patterning the blackmask absorber layer to remove the blackmask absorber layer in optically active areas of the MEMS device.

25. The method of claim 20, wherein the sacrificial layer comprises the same material as the optical absorber and blackmask absorber.

26. The method of claim 20, wherein each of the sacrificial layer, the optical absorber, and the blackmask absorber comprise a layer of molybdenum.

27. The method of claim 20, additionally exposing the sacrificial layer to a plasma environment comprising $N_2O$ prior to formation of the deformable layer.

28. The method of claim 27, wherein exposing the sacrificial layer to a plasma environment comprising $N_2O$ is done after formation of the at least one support structure.

29. The method of claim 20, additionally comprising forming a bussing structure in electrical communication with the optical absorber.

30. The method of claim 29, wherein forming the bussing structure comprises:
    forming a first bussing sublayer;
    exposing the first bussing sublayer to vacuum for a period of time; and
    forming a second bussing sublayer over the first layer after exposing the first bussing sublayer to vacuum.

31. The method of claim 30, wherein the first bussing layer comprises an aluminum-neodymium alloy comprising about 2 atomic % neodymium, and wherein the second bussing layer comprises a nickel-boron alloy comprising about 0.5 atomic % boron.

32. The method of claim 20, wherein forming the deformable layer comprises:
    forming a reflective sublayer over the sacrificial layer, the reflective sublayer comprising aluminum; and
    forming a mechanical sublayer over the first sublayer, the mechanical sublayer comprising nickel.

33. The method of claim 32, wherein the reflective sublayer comprises an aluminum-neodymium alloy comprising about 2% neodymium.

34. The method of claim 32, wherein the mechanical sublayer comprises a nickel-boron alloy comprising about 0.5% boron.

35. An optical MEMS device, comprising:
- a conductive optical absorber formed over a substrate and patterned to form strip electrodes, wherein the optical absorber serves as the primary conductor in said strip electrodes within optically active areas of the MEMS device;
- a blackmask absorber layer, wherein the blackmask absorber comprises the same material as the optical absorber;
- at least one support structure formed over the black mask absorber layer; and
- a conductive deformable layer formed over the at least one support structure and spaced apart from the conductive optical absorber, wherein the deformable layer is electrostatically deflectable towards the optical absorber.

36. The device of claim 35, wherein the blackmask absorber is located in optically inactive areas of the display.

37. The device of claim 35, wherein the deformable layer comprises a reflective sublayer facing the optical absorber and a mechanical sublayer overlying the reflective sublayer.

38. The device of claim 36, wherein the reflective sublayer comprises aluminum.

* * * * *